United States Patent [19]

Rétfalvi et al.

[11] Patent Number: 4,605,836
[45] Date of Patent: Aug. 12, 1986

[54] PROCESS FOR ACHIEVING PROPER WELD QUALITY IN COURSE OF THE WELDING OPERATION, MARKING THE FAULTS ON THE WORKPIECES AND CERTIFYING THE QUALITY

[75] Inventors: Ferenc Rétfalvi; László Lukács, both of Budapest; László Molnár, Dunaujváros; György Dózsa, Dunaujváros; Ádám Szappanos, Dunaujváros, all of Hungary

[73] Assignee: Kohaszati Gyarepito Vallalat, Budapest, Hungary

[21] Appl. No.: 662,417

[22] PCT Filed: Jan. 26, 1984

[86] PCT No.: PCT/HU84/00007
§ 371 Date: Sep. 21, 1984
§ 102(e) Date: Sep. 21, 1984

[87] PCT Pub. No.: WO84/02866
PCT Pub. Date: Aug. 2, 1984

[30] Foreign Application Priority Data

Jan. 26, 1983 [HU] Hungary .................... 243/83

[51] Int. Cl.[4] .............................. B23K 9/10
[52] U.S. Cl. ................... 219/130.01; 219/137 PS
[58] Field of Search .............. 219/130.01, 137 PS

[56] References Cited

U.S. PATENT DOCUMENTS

| 3,632,960 | 1/1972 | Erdmann-Jesnitzer et al. | 219/130.01 |
| 3,673,377 | 6/1972 | Erdmann-Jesnitzer et al. | 219/130.01 |
| 4,375,026 | 2/1983 | Kearney | 219/130.01 |

FOREIGN PATENT DOCUMENTS

| 1806648 | 5/1970 | Fed. Rep. of Germany . |
| 2324639 | 12/1974 | Fed. Rep. of Germany . |
| 2813339 | 10/1979 | Fed. Rep. of Germany . |
| 2813260 | 10/1979 | Fed. Rep. of Germany .............. 219/130.01 |

Primary Examiner—Clifford C. Shaw
Attorney, Agent, or Firm—Handal & Morofsky

[57] ABSTRACT

A process for maintaining weld quality during welding operation, marking the fault spots on the workpiece and certifying of quality, in the course of which instantaneous values of arc current and arc voltage characterizing manual or mechanized welding process are continuously measured and from the values thus obtained relative short-circuit time of the arc, drop frequency and arc outputs are continuously calculated.

The measured and calculated values are compared with empirically determined optimal values, thus defining absolute values and signals representing the directions of deviations, as well as duration of deviations, are compared on a predetermined span of time and averages of absolute values and signals representing the directions are defined. Averages and quotients are recorded and simultaneously averages of the absolute values are compared with a first and second limit value and in case, if they fall between the first and second limit value, a warning signal is given for the welder, and if averages are exceeding the second limit value, a further signal is given and simultaneously a fault spot is marked on the workpiece until the averages are reduced below the second limit value.

6 Claims, 1 Drawing Figure

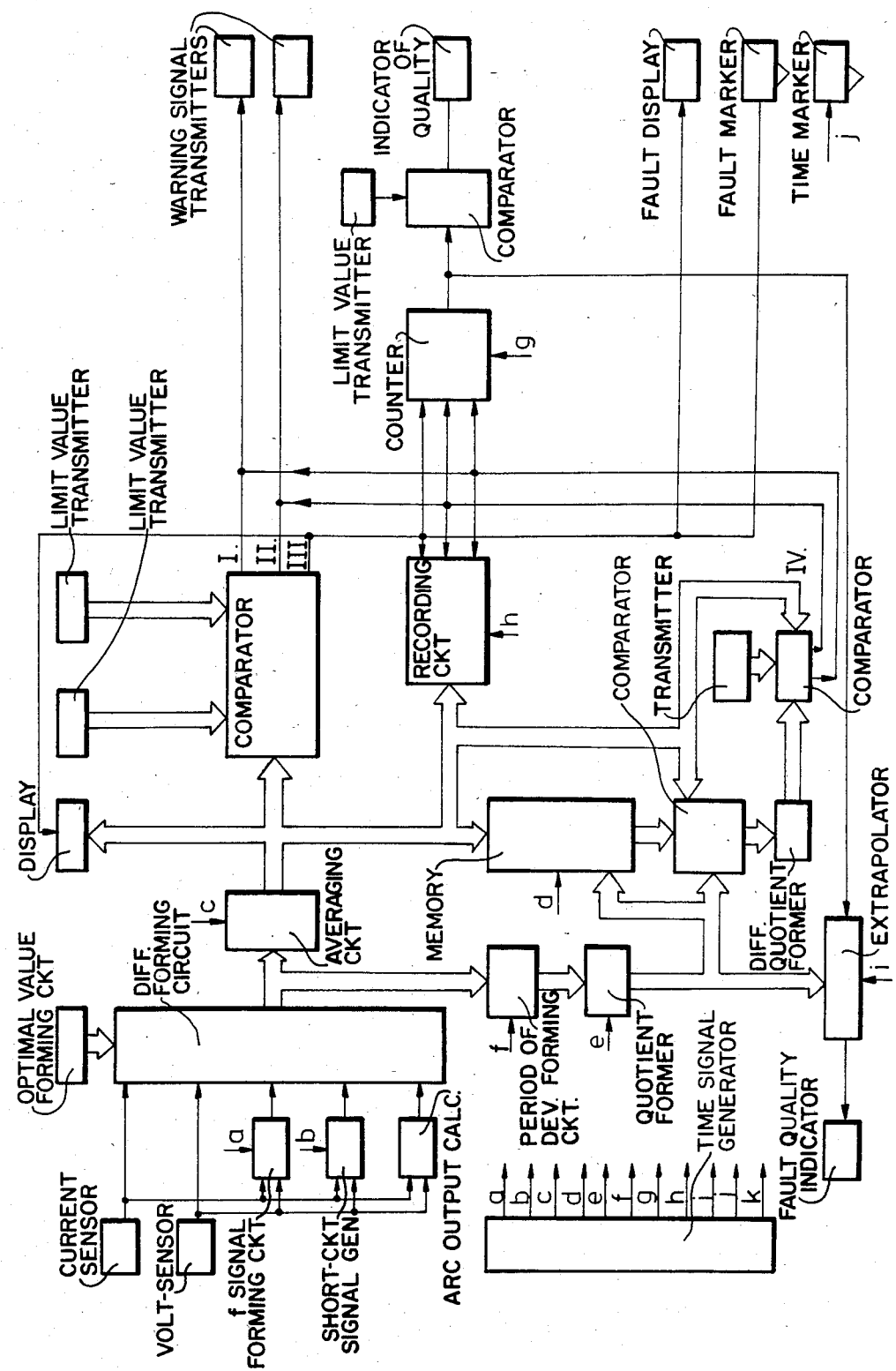

PROCESS FOR ACHIEVING PROPER WELD QUALITY IN COURSE OF THE WELDING OPERATION, MARKING THE FAULTS ON THE WORKPIECES AND CERTIFYING THE QUALITY

FIELD AND BACKGROUND OF THE INVENTION

The invention relates to a process which enables maintenance of proper weld quality in the course of a welding operation by calling the attention of the worker to the failure prior to occurring. Furtheron, the process is well suited for marking the failure spots on the workpiece and by recording continuously input signals and processed signals (failure signals) for the demonstration of quality.

In the course of producing steel structures quality of the welding fastening the single elements of the structure to each other ultimately determines the quality of said structures, accordingly, a considerable part of productional costs are alloted to welding and testing thereof. In addition to high costs, this fact fundamentally influences transit time, since only few welders are able to produce faultless welds being in compliance with the high qualitative demands. Costs and transit time are further increased by the necessity that for the sake of product control welds are to be subjected to an X-ray examination and after having corrected the faults, inspection with a repeated X-ray examination is also imperative. Correction, however, may result in damages in the basic material causing premature failure of the structures i.e. reduction of loadability.

Up to now it has been attempted to eliminate said problems so that are welding apparatuses have been set as optimal as possible and, provided with means regulating the process during operation. This method proved unsuccessful, in particular, under adverse circumstances.

In the patent No. HU 164 536 a process for the setting of welding apparatuses is described. This patent starts from the conception that melting of the welding electrodes and, accordingly the welding properties, are fundamentally determined by the electric parameters of the welding process (welding voltage and arc current, relative period of short-circuiting and drop frequency, both to be calculated therefrom).

By measuring the arc current and voltage the welding parameters of a given task can be determined, thereafter, by changing inductive resistance of the welding apparatus optimal values of the velocity of changing current are adjusted. The welder performs his work with this optimally set apparatus.

According to the patent U.S. Pat. No. 4,103,141 it is not sufficient to set the welding apparatus prior to beginning the welding process only once, but it has to be regulated continuously during the process in order to keep the values of arc voltage and arc current within a predetermined range, whereby welding of proper quality can be obtained.

An equipment is also known which controls the welder himself while working.

Such an equipment is disclosed in the patent U.S. Pat. No. 4,063,075. This solution functions by means of measuring stations having been installed on single working places where a centrally located computer controls and records the activity of single workers (maximally for 100 working places). The computer registers the number of arc ignitions, duration of continuous welding, the parameters and consumed electric energy.

The previously described patents examine but the process of welding and did not yield a satisfactory solution; in the course of practice experience could be gained, and even with optimally adjusted and controlling (semi-automatic) apparatuses only well qualified welders are able to make a faultless weld and even in this case qualification can be negatively influenced by tiredness, inattention, bad conditions etc., as a consequence control X-ray examinations of a considerable number cannot be omitted.

The known apparatus controlling the welders themselves did not yield the solution needed either, as it controls the power and efficiency of the worker and his discipline of labour but qualitative welds are not at all assured.

Experiences having been gained in the course of long years of practice unambiguously show that weld quality primarily depends on the welder himself and only secondarly on the apparatus used, as improper function of the apparatus or smaller errors of adjusting can be equalized by the knowledge, experience and manual skill of the welder, at the same time, if these qualifications are missing even with the optimally adjusted apparatus weld faults will occur.

Welders perform fundamental welding phases using a plurality of individual methods, e.g. with different handpositions, all influencing the result of the welding and quality of welding. Analysing the work of welders, a general working method can be determined, representing the working system of highly qualified welders.

SUMMARY OF THE INVENTION

Our invention was elaborated on the basis of the parameters corresponding to this general system, the application of which can taught to the welders in course of training in a rather short time.

Accordingly, our intention is to solve the following tasks by using the process according to the invention:
increasing "knowledge and manual skill" of the welders by means of informative warning signals
forecast the physical fitness of the welder on basis of faults percentage at the beginning of the shift
signalization of momentary faults to the welder and other controlstations, e.g. at the foreman's station
signalization of the possibility of making a faulty welding i.e. marking it on the workpiece (accordingly nondestructive testing can be restricted to these parts)
certifying of proper welding quality
qualifying the welder.

Realization of the aims set is based on the following recognitions;
(a) for every welding operation an optimal working point can be determined (empirically) on the curve arc current-arc voltage and there is an optimal arc output i.e. interval;
(b) similarly, there exist an optimal short-circuit time and drop frequency, i.e. an interval;
(c) the welds prepared will be of proper quality, if average values of the arc-parameters (current, voltage, drop frequency, relative short-circuit time and arc output) are falling into the determined environment of the optimum points, while if they are coincident or lie outside thereof, a faulty weld will be probably made;

(d) a faulty weld can be reckoned with, if velocity of deviation of the average of the arc-parameters is reaching a critical value;

(e) comparing the difference between the momentary values and the optimal values with the total time and extrapolating their tendency, condition of the welder can be presignallized, i.e. expectable percent of faults can be predetermined.

Accordingly, our invention relates to a process for the maintenance of weld quality during operation, marking of the faultspots on the workpieces and certifying the quality. In the course of the process momentary values of arc current and arc voltage being characteristic for the welding process are continuously measured and on the basis of measured data relative short circuit time of the arc, drop frequency and arc output are continuously calculated.

The essence of the invention lies in that both measured and calculated values are compared with empirically determined optimal values, while absolute values and signals representing the directions, as well as duration of deviations are determined, thereafter the averages of absolute values and signals representing the direction are formed related to a predetermined period, furtheron quotient of the duration of deviations and predetermined duration is formed.

Average values and said quotient are registered. Simultaneously with recording we examine the proportion of the absolute values to a first and second limit values. In case, if these absolute values fall between the first and second limit values an alarming signal is given for the welder. In case, if averages surpass the second limit value, a further alarming signal is given, simultaneously the workpiece is marked, as long as the averages fall below the second limit value.

In course of the process according to the invention and the newly calculated average of the absolute values and quotient of duration are compared with the previously formed and recorded average and quotient. Velocity of change is also determined and in case, if a third limit value is surpassed, a warning signal is given before average values would surpass the first average value.

In accordance with the invention—to be able to perform pre-signalization—the number of surpassings of the first and second limit values are counted, and then perspectively compared with a longer span of time i.e., to an hour, and in case, if these values surpass a further limit value, a signal is given for each.

Determination of possible fault places is performed so, in addition, to fault markings a time-marking arc is also marked on the workpiece. Markers relating to time and faults, respectively, are made with dyestuffs of different colour.

When giving the warning signals, a signal is given in dependence of the average of signals indicating also the directions.

BRIEF DESCRIPTION OF THE DRAWING

The invention will be detailed by means of the drawing enclosed, wherein with reference to an examplary circuit diagram of the apparatus for practicing the invention, a possible version of the process is specified.

DESCRIPTION OF THE PREFERRED METHOD AND EMBODIMENT

While welding, momentary values of arc current and arc voltage characterizing welding process are measured by means of the arc current sensor 1 and arc voltage sensor 2 having been connected to the output terminals of the arc welding apparatus supplying welding current. From the momentary values having been measured relative short-circuit time, drop frequency and momentary value of arc output are measured by means of the drop frequency signal forming unit 4, the unit 5 generating short-circuit signal and the unit 6 calculating arc output; measuring is continuously performed. Signals representing momentary values are led to the signal inputs of unit 7 forming the difference. Reference signal inputs of the unit 7 are connected to the outputs of the unit 8 yielding the optimal value, delivering the optimal arc parameter values of a given welding task having been determined empirically. With the aid of the difference forming unit 7 we compare the measured and calculated values of the arc parameters with the corresponding optimal values, simultaneously determining absolute values of deviation and belonging directions. Signals are forwarded partly to the unit 9, forming the average, partly to the unit 15 defining period of deviation.

Absolute value and average of the directions are formed, in the unit 9, forming the average for an empirically fixed period, which can change depending on the task set. Average values and directions having been formed are led partly to the inputs of the comparing unit 11, the inputs of the recorder 19 and partly to the inputs of the memory 10. By means of the memory 10 average values and signals representing the directions of deviations are stored provisionally, while the recording unit 19 serves for the final storing. Said signals are led to the display 29 displaying the type of the fault which occured and to one of the inputs of the comparator 14.

Comparator 11 examines, whether the averages are falling between a first and a second limit value, respectively, or surpass the second limit value. Limit value signals are supplied by the first limit value transmitter 12 and the second limit value transmitter 13. In case, if the average fall into the range between the first and second limit value, a warning signal is omitted. In addition, the given warning signal depends on the average directional sign of the deviations, accordingly, if the average lies below the optimal values, a warning signal I is given, while if it lies above it, a warning signal II will be released on the first and second output of the comparator 11. If the welder operates within the optimal values, no signal if given.

With the aid of the warning signal transmitters 3, respectively, 23 having been installed into the face shield of the welder the warning signals I, respectively II are transmitted, calling the attention of the welder to the expectable occurence of a fault and giving the proposed method of avoidence, in such a manner welders with inferior qualification can also prepare welds of proper quality.

In case, the averages surpass the second limit value, on the third output of the comparative unit 11 a warning signal III is released. Warning signal III appears on the working place on the fault display 22 and the display 28 displaying the type of fault, simultaneously averages of deviations of welding parameters also appear; while the fault signal exists, the fault marker 25 is marking the faulty welding on the working pieces with a dyestuff marking.

Recorder 19 serves for the documentation of the complete welding process which records the average of deviations of the welding parameters, warning signals I and II and fault signal III depending on time. In order to be able to identify recording of the recorder 19 with the weld on the workpieces, marking unit 24 marks the time on the working piece with a different colour.

As previously mentioned, the outputs of the unit 7 forming the difference are also connected to the input of the unit 15 defining deviation time. On the outputs of the unit 15 time signals will exist as long as the given welding parameter deviates from the optimal value.

Said time signals indicating timely difference are led to the quotient forming unit 16, wherein quotients of duration of deviation are formed related to a predetermined span of time. Output signals of the quotient forming unit 16 are led partly to the inputs of the memory 10, partly to the comparator 14 and partly to the inputs of the extrapolating unit 28. Accordingly, in the memory 10 average values, signals representing the directions and quotients of timely deviations are stored; in the next period said stored signals are compared with the identical signals just formed by means of the comparator 14. By means of the differential quotient forming unit 17 velocity of change of the signals representing the result of comparison is determined, thereafter velocity signals obtained are compared with the limit signals delivered by the basic signal transmitter 32 in the comparator 18; in case, if velocity signals surpass the limit signal, warning signal I, and, II are omitted depending on the character of the directional sign of the momentary average of the welding parameter deviation in accordance with the directional signs IV introduced. In such a manner the welder can be warned prior to surpassing the first limit value.

Warning signals I and II, as well as fault signals III are led into the counter 20, the number of the signals arriving during an hour is counted. In the course of counting fault signal III is considered with a multiple averaging as a three-fourfold value. Number of signals appearing within an hour are compared in the comparative unit 26 with the limit signal delivered by the limit value transmitter 27; in case of a positive result deterioration of quality is signalled on the unit 30. By determining the quantity of several differing limit signals both the workpiece and the welder can be qualified.

Output signal of the counter 20 is led to the outer input of the extrapolating unit 28, to the first input of which the signals of the quotients indicating the duration of fault are led. By means of the extrapolating unit 28, on basis of the development of said signals, at the beginning of the shift, e.g. at the end of the first working hour, conclusions can be made in respect to the quality of faults to be expected during the whole working time. Said value is indicated by the unit 31 indicating the magnitude of the faults to be expected, thus informing the foreman about the condition of the welder on this specific working day.

Co-ordinated operation of the equipment demands a plurality of time signals, the transmitter 21 delivers the required time signals a . . . k.

It becomes obvious that warning signals I and II emitted in due time in accordance with the invention enable the welder to avoid faulty welds, as warning signals appear so as to enable avoiding the faults; the information delivered give the directives for changing work performance in a positive direction, as a consequence, after a short period of training a welder with an inferior qualification and less experience is also able to make welds of first class quality, which could be made otherwise—without the solution according to the invention—only by a highly qualified welder with a long experience. It goes without saying that the invention involves several additional advantages, as e.g. by marking the reduced faults, duration of non-destructive tests can be shortened, expenses are reduced, as only the marked sections are to be tested, for the other sections weld quality is documented in the register.

We claim:

1. Process for maintaining weld quality during welding operation, comprising the marking of the fault spots on the workpiece and certifying of quality, in course of which momentary values of arc current and arc voltage characterizing manual or mechanized welding process are continuously measured and from the values thus obtained relative short-circuit time of the arc, drop frequency and arc power outputs are continuously calculated, said measured momentary values of arc current and arc voltage and said calculated values of relative short-circuit time of the arc, drop frequency and arc power outputs are compared with empirically determined optimal values, thus defining absolute values and signals representing the directions of deviations, duration of deviations, said directions and duration of deviations being related to a predetermined span of time averages of absolute values and, defining signals representing the directions of deviations, forming a quotient of the duration of deviations and of pre-determined durations; said averages of absolute values and said quotients of the duration of deviations and of predetermined durations are recorded and simultaneously averages of the absolute values are compared with a first and second limit value and at a magnitude between the first and second limit value, a warning signal is given for the welder, and at a magnitude exceeding the second limit value a further signal is given and simultaneously a fault spot is marked on the workpiece until said exceeding magnitude is reduced below the second limit value.

2. Process as claimed in claim 1, wherein the forming of the average of absolute values and quotient of durations is repeated and the last formed average of absolute values and quotient of durations are compared with previously formed average and quotient values, determining the velocity of change therefrom and if a third limit value is exceeded, a warning signal is given, before the average values could exceed the first limit value.

3. Process as claimed in claim 1 wherein the frequency exceeding the first and second limit values is assigned to a larger span of time, and in case, if such frequency is larger than a further limit value for the assigned time span, a signal is emitted.

4. Process as claimed in claim 1, wherein in addition to marking the fault spots, time-markers for time units are also applied onto the working piece.

5. Process as claimed in claim 4, characterized in that marking of faults and time-markers are of different colour, using different dyestuffs.

6. Process as claimed in claim 1 wherein when exceeding the first limit value, in addition to the given warning signal, a signal is given representing the directions of deviations.

* * * * *